US012674526B2

(12) United States Patent
König et al.

(10) Patent No.: US 12,674,526 B2
(45) Date of Patent: Jul. 7, 2026

(54) DEVICE FOR FIXING PIPES AND LINES

(71) Applicant: Walter Stauffenberg GmbH & Co. KG, Werdohl (DE)

(72) Inventors: Ulrich Stefan König, Herscheid (DE); Matthäus Schulz, Attendorn (DE); Elena Epp, Herscheid (DE)

(73) Assignee: Walter Stauffenberg GmbH & Co. KG, Werdohl (DE)

( * ) Notice: Subject to any disclaimer, the term of this patent is extended or adjusted under 35 U.S.C. 154(b) by 76 days.

(21) Appl. No.: 18/839,068

(22) PCT Filed: Dec. 22, 2022

(86) PCT No.: PCT/EP2022/087619
§ 371 (c)(1),
(2) Date: Aug. 16, 2024

(87) PCT Pub. No.: WO2023/160866
PCT Pub. Date: Aug. 31, 2023

(65) Prior Publication Data
US 2025/0164038 A1      May 22, 2025

(30) Foreign Application Priority Data

Feb. 22, 2022     (EP) ..................................... 22158011

(51) Int. Cl.
*F16L 3/223*          (2006.01)
(52) U.S. Cl.
CPC .................................. *F16L 3/2235* (2013.01)
(58) Field of Classification Search
CPC ............ F16L 3/2235; F16L 3/221; F16L 3/16
See application file for complete search history.

(56) References Cited

U.S. PATENT DOCUMENTS 2,356,318 A * 8/1944 Richard ................ F16L 3/2235
                                                    24/135 R
2,417,260 A * 3/1947 Morehouse ............. F16L 3/227
                                                    174/157
(Continued)

FOREIGN PATENT DOCUMENTS

DE          7423062 U      9/1974
DE      196 28 689 A1     1/1998
(Continued)

OTHER PUBLICATIONS

International Search Report in PCT/EP2022/087619, mailed Mar. 23, 2023.

*Primary Examiner* — Terrell L McKinnon
*Assistant Examiner* — Ding Y Tan
(74) *Attorney, Agent, or Firm* — Collard & Roe, P.C.

(57)           ABSTRACT

A device for fixing pipes, in particular in the field of shipbuilding and offshore platforms, includes at least one clamp which includes first and second clamp parts, each having a recess which, when assembled, form a passage for receiving a pipe, in which passage at least three longitudinal ribs, which extend in the longitudinal direction of the pipe, are arranged, at a distance from one another, to support a received pipe. Two bracing rails are arranged; the first clamp part can be adjustably fixed to the first bracing rail and the second clamp part can be adjustably fixed to the second bracing rail; and the two bracing rails are connected opposite one another by braces for bracing the bracing rails, as a result of which the first and second clamp parts arranged opposite one another can be braced against a pipe received by the clamp.

15 Claims, 3 Drawing Sheets

(56)                References Cited

U.S. PATENT DOCUMENTS

Figure 1:
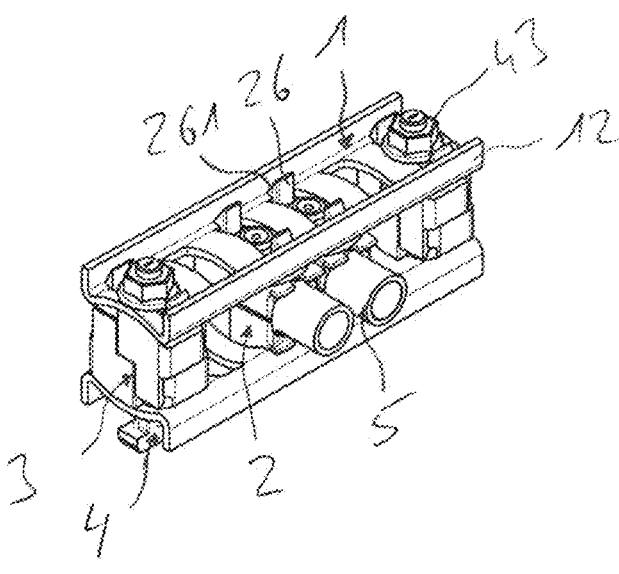

| | | | | |
|---|---|---|---|---|
| 3,087,009 | A | 4/1963 | Lucien | |
| 6,902,138 | B2 * | 6/2005 | Vantouroux | F16L 3/1091 |
| | | | | 248/68.1 |
| 8,985,533 | B2 * | 3/2015 | Edmond | F16L 3/1222 |
| | | | | 248/74.1 |
| 10,030,790 | B2 * | 7/2018 | Nakovski | G01V 1/202 |
| 10,034,971 | B2 * | 7/2018 | Abu-Sultaneh | A61M 25/02 |
| 10,612,696 | B2 * | 4/2020 | Milner | F16B 2/12 |
| 11,802,636 | B2 * | 10/2023 | Arcand | F03D 80/85 |
| 2009/0218451 | A1 * | 9/2009 | Lundborg | F16L 5/02 |
| | | | | 248/65 |
| 2016/0076689 | A1 * | 3/2016 | Kato | F16L 3/1091 |
| | | | | 248/636 |
| 2016/0334044 | A1 * | 11/2016 | Koenig | F16L 3/1075 |

FOREIGN PATENT DOCUMENTS

| | | | | |
|---|---|---|---|---|
| DE | 19628689 C2 * | 6/1998 | | F16L 3/16 |
| DE | 20 2004 004 425 U1 | 6/2004 | | |
| DE | 10324712 B3 * | 9/2004 | | F16L 3/2235 |
| DE | 20 2009 007 263 U1 | 8/2009 | | |
| WO | WO-2009022960 A1 * | 2/2009 | | H02G 3/22 |

* cited by examiner a)

b)

c)

a)

b)

c)

a)                                    b)

DEVICE FOR FIXING PIPES AND LINES

CROSS REFERENCE TO RELATED APPLICATIONS

This application is the National Stage of PCT/EP2022/087619 filed on Dec. 22, 2022, which claims priority under 35 U.S.C. § 119 of European Application No. 22158011.1 filed on Feb. 22, 2022, the disclosure of which is incorporated by reference. The international application under PCT article 21(2) was not published in English.

The invention relates to a device for fastening pipes or lines in place, in particular in the field of shipbuilding and offshore platforms, comprising at least one clamp that comprises a first clamp part and a second clamp part, which clamp parts each have a recess, which recesses, when assembled, form a passage for holding a pipe, in which passage at least three ribs are arranged, at a distance from one another, for making contact with a held pipe, the ribs extending in the longitudinal direction of this pipe.

In regions close to the coast, as well as in shipbuilding applications and offshore applications, stainless steel pipes are regularly used to prevent corrosion in the case of lines that conduct media. These areas of application are characterized by a damp to wet environment, in conjunction with the influences that are caused by the salt concentrations contained in the air and in the water. The corrosion protection that can be achieved by means of the stainless steel pipes has proven itself. Such lines must be guided and held. This is regularly done by means of pipe fastening means that frequently have radial or longitudinal ribs, between which the pipe is braced.

The pipelines, including the fasteners, are exposed to the weather; they are wetted with water by means of rain, fog or spray. In this regard, the open surfaces dry out without problems. However, it is problematical that the interstices that form between the rib surfaces and the pipe dry out only insufficiently. As a result, a liquid film remains, which can lead to crevice corrosion. The surface of the stainless steel pipe is attacked by means of this crevice corrosion. For this reason, the pipe fasteners are usually opened once a year by the users. If no crevice corrosion is found, the pipe fastener is installed once again. Otherwise, not only the pipe fastener but also the entire pipe must be replaced, causing a great expenditure of time and costs.

To improve the corrosion protection, it is known to wrap the fastening location with a special corrosion protection tape. The corrosion protection achieved in this way is good, but the effort and expense is very great. In particular, the annual inspection is made more difficult, since the pipe has the tape wrapped around it at the position to be checked. Likewise, good results are achieved when using a special surface sealant, but this again is connected with great effort and expenditure, in particular during the annual inspection.

Against this background, a device for fastening a pipe in place is described in DE 20 2009 007 263 U1, in which the ribs are configured, within the passage, as longitudinal ribs running along the pipe axis, directed toward the pipe axis. This solution has proven itself in practice. By means of providing longitudinal ribs, good ventilation of the fastening locations is achieved, and thereby rapid drying out of moisture films is brought about. Furthermore, the configuration as longitudinal ribs makes it possible for liquids to flow out of the pipe fastener to the side. In practice, the longitudinal ribs are regularly configured as elastomer strips, and thereby excellent resistance to contact corrosion is achieved. In this regard, the elastomer strips have a trapezoid cross-section. It has proven to be decisive that the end edges of elastomer strips toward the pipe are structured in an obtuse angle.

When fastening pipes in place, multiple clamps, called "multi-clamps," are used; these have multiple passages for holding pipes and thereby make it possible to fasten multiple pipes in place in a tight space. In this regard, however, it proves to be problematical that in order to achieve the optimal resistance to contact corrosion, the pipes must run through the clamp as precisely concentric as possible and without any deviation in angle. However, angle deviations of the pipes to be fastened in place can only be avoided in rare cases and with great effort and expenditure.

This is where the invention seeks to provide a remedy. The invention is based on the task of making available a device for fastening pipes in place, which device allows a precisely concentric progression through the clamp even in the case of angle deviations of the pipes to be fastened in place. According to the invention, this task is accomplished by means of a device having the characteristics of the characterizing part of claim 1.

With the invention, a device for fastening pipes in place, in particular in the field of shipbuilding and offshore platforms, is made available, in which a precise concentric progression of the respective pipes through the clamp is guaranteed even in the event of angle deviations of the pipes. Because of the fact that two bracing rails are arranged, wherein the first clamp part of the at least one clamp can be adjustably fixed in place on the first bracing rail, and the second clamp part of the at least one clamp can be adjustably fixed in place on the second bracing rail, wherein the two bracing rails are connected opposite one another by means of bracing means, by means of which they can be braced relative to one another, tensioning of the first and second clamp parts of the clamps that are arranged, against the pipes held by them, in each instance, is made possible, wherein each individual clamp can be adjusted, in terms of its position, between the two bracing rails.

In the following, "adjustable fastening in place" is understood to be fastening in place that is configured in such a manner that the position of the clamp relative to the bracing rail can be changed within a defined angle range. Preferably, the adjustable fastening in place is configured in such a manner that it allows a change in position of the clamp relative to the bracing rail of up to +/−3°.

By means of guaranteeing a precisely concentric progression of the respective pipes within a clamp, an obtuse angle is guaranteed between the end edges of the longitudinal ribs with regard to the pipe, in each instance, and thereby a high quality of the resistance to contact erosion is achieved.

In a further development of the invention, the two bracing rails are each provided with perforations, wherein the first and second clamp parts, in each instance, have at least one fastening element that engages behind one of these perforations, penetrating through it. In this way, pre-assembly of the first and second clamp parts on the two bracing rails is achieved.

In an embodiment of the invention, at least two, but preferably all of the perforations are configured to be rectangular and are arranged uniformly at a distance from and parallel to one another, in the corresponding bracing rail. In this way, a defined, uniform distance between individually arranged clamps is guaranteed.

In a further embodiment of the invention, the clamp parts have two fastening elements that are configured in the form of spring tongues that lie opposite one another and have engagement projections, wherein the engagement projections each extend in the direction facing away from the opposite spring tongue, and engage behind the corresponding perforation. In this way, simple, engaged installation of the individual clamp parts on a bracing rail is made possible. In this regard, the clamp parts can be easily removed, so that they can be replaced, if necessary, for example if pipes having different diameters must be fastened in place next to one another.

In a further development of the invention, the clamp parts have a preferably cylindrical guide dome between the two fastening parts, which dome projects through the corresponding perforation. In this way, tilting of the clamp during the course of an angle adjustment, caused by the angled progression of a pipe to be held, is prevented.

In a further development of the invention, the clamping rails have an inner curvature that is curved about their longitudinal axis, preferably with an arc-shaped cross-section, wherein the clamp parts of the at least one clamp have an outer curvature, preferably in the form of a spherical section, with which they lie against the inner curvature of a bracing rail. In this way, planar contact of the clamp parts on the bracing rail is guaranteed even after their angle adjustment.

In an embodiment of the invention, the first and second clamp parts are configured to be identical. In this way, the plurality of parts is reduced, and thereby production costs and warehousing costs are reduced.

In a further embodiment of the invention, the clamping means comprise at least two tensioning anchors spaced apart from one another, each of which is guided through a perforation of the two bracing rails, as well as through a spacer block arranged between the bracing rails. In this way, uniform tensioning of the two bracing rails relative to one another is made possible. Preferably, the tensioning anchor comprises a threaded rod onto which a nut is screwed, by way of which nut the bracing rails can be tensioned relative to one another. It is advantageous if the nut is configured as a hex flange nut or also as a wing nut.

In a further development of the invention, the spacer block comprises a first and a second block piece, wherein the first block piece is fastened to the first bracing rail and the second block piece is fastened to the second bracing rail, wherein the block pieces each have at least one fastening element that engages behind one of the perforations of the bracing rail, in each instance, passing through this perforation. In this way, pre-assembly of the block pieces on the bracing rails is made possible.

In a further embodiment of the invention, the block pieces have two fastening elements that are configured in the form of spring tongues arranged opposite one another and provided with engagement projections, wherein the engagement projections extend, in each instance, in the direction facing away from the opposite spring tongue, and engage behind the perforation, in each instance. In this way, simple, latched installation of the block pieces on the bracing rails is made possible.

In a further embodiment of the invention, the block pieces of each spacer block have an outer curvature with which they lie against the inner curvature of a bracing rail. In this way, planar contact of the block pieces on the bracing rails is guaranteed.

In a further development of the invention, at least one of the two block pieces, preferably both block pieces, has/have at least one engagement element, by means of which it can be connected, with shape fit, with the other block piece. In this way, a simple, latching connection of the block pieces connected with a bracing rail is made possible.

In an embodiment of the invention, the block pieces of a spacer block are configured identically. In this way, the plurality of components is reduced, and thereby production costs and warehousing costs are reduced.

Figure 2:
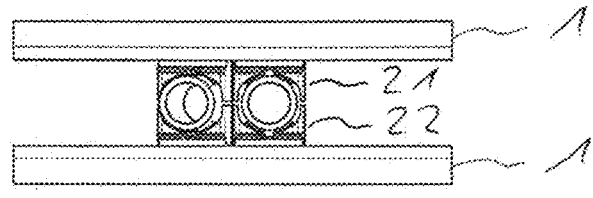
Figure 2:
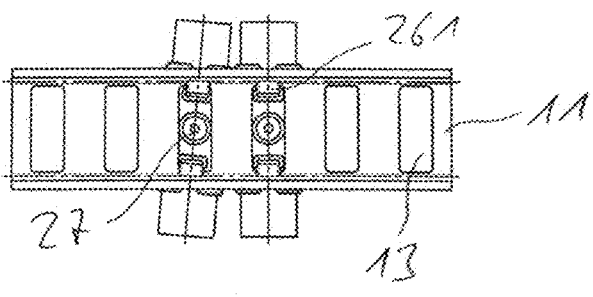
Figure 2:
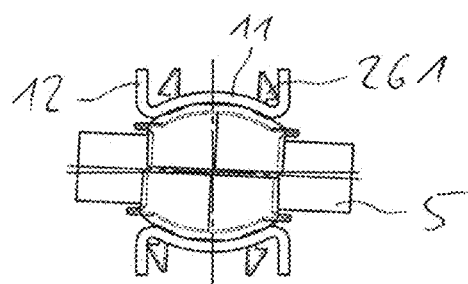
Figure 3:
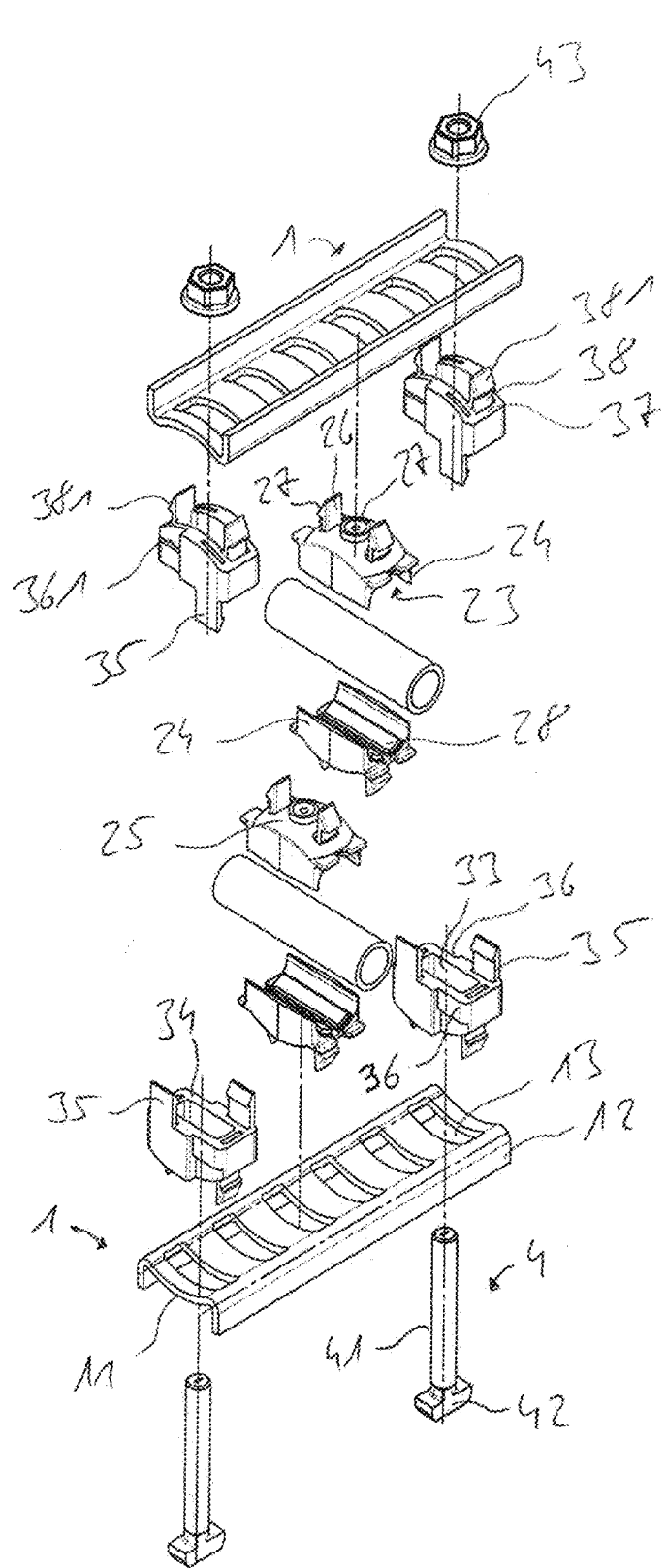
Figures 4, 5:
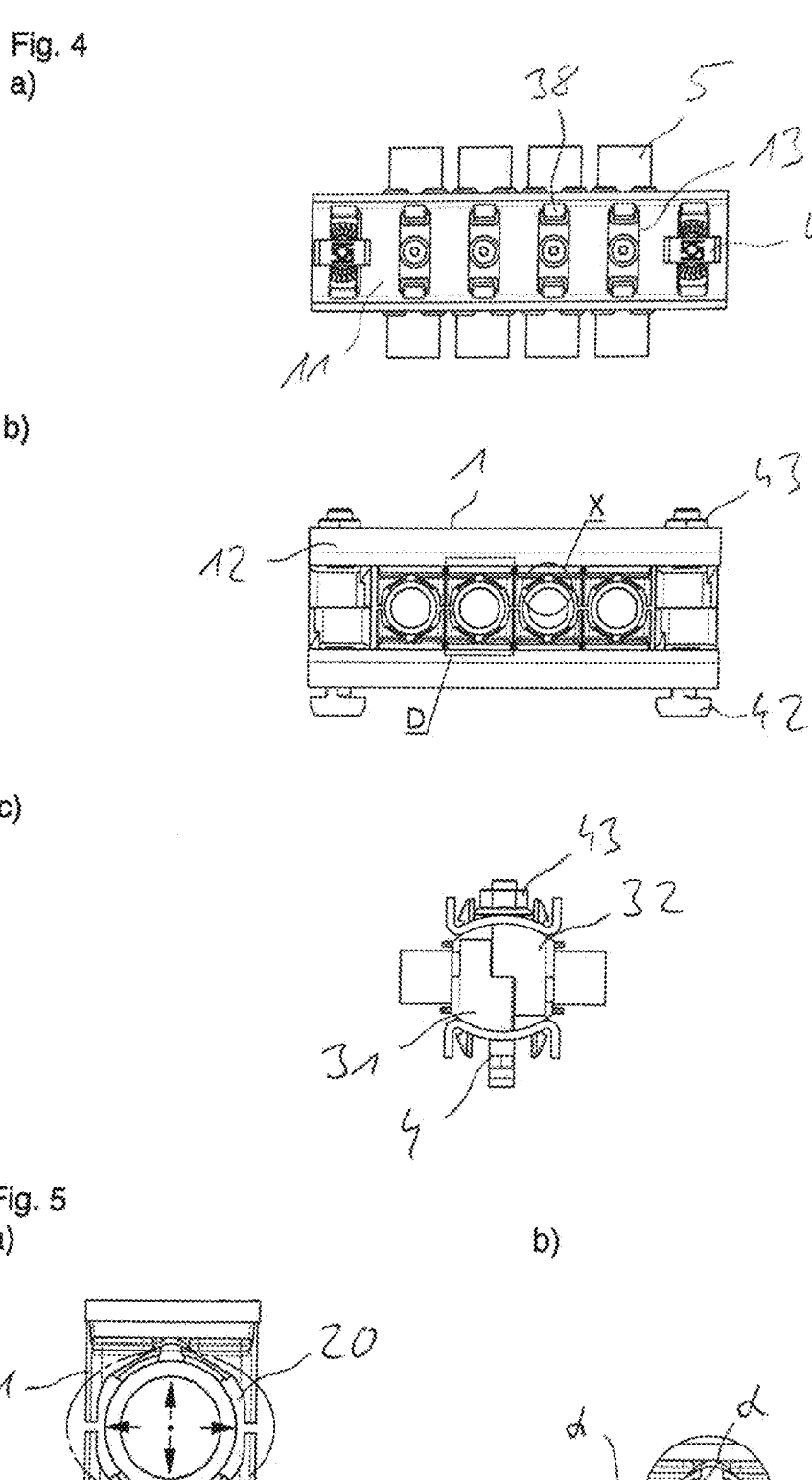

Other further developments and embodiments of the invention are indicated in the remaining dependent claims. Exemplary embodiments of the invention are shown in the drawings and will be described in detail below. The figures show:

FIG. 1 a schematic, spatial representation of a device for fastening two indicated pipes in place;

FIG. 2 a schematic representation of the device from FIG. 1, without tensioning anchors and spacer blocks
   a) in a view from the front;
   b) in a top view;
   c) in a side view;

FIG. 3 the device from FIG. 1 in an exploded representation;

FIG. 4 a schematic representation of an apparatus for fastening pipes in place, in a further embodiment
   a) in a view from below;
   b) in a view from the front;
   c) in a side view;

FIG. 5 a detail representation of the device from FIG. 4
   a) in Detail D;
   b) in Detail X.

The device chosen as an exemplary embodiment essentially consists of two bracing rails 1 arranged parallel to one another, between which two clamps 2 are arranged, as well as spacer blocks 3, through which tensioning anchors 4 for tensioning the bracing rails 1 against one another are passed.

The bracing rails 1 are configured, in the exemplary embodiment, as identical C profile rails that are produced as punched and bent sheet-metal parts. Alternatively, production as a sheet-metal profile or as a plastic injection-molded part is also possible. The bracing rails 1 have a cover side 11, which makes a transition, on its longitudinal sides, in each instance, into a side strip 12 that is set at an obtuse angle, in the present case at an angle of 95°. The cover side 11 is configured to be curved inward in the direction of the side strip, wherein it has a curvature in the form of a cylindrical mantle section along its longitudinal center axis, the cross-section of which curvature is configured in the form of an arc. Rectangular perforations 13, spaced apart from one another, extending in the transverse direction between the side strips, are introduced into the cover side 11.

In the exemplary embodiment, the clamps 2 are configured as plastic injection-molded parts and comprise, in each instance, a first clamp part 21 and a second clamp part 22. In the exemplary embodiment, the first and second clamp parts 21, 22 are configured identically. The clamp parts 21, 22 have a groove-shaped recess 23 that is delimited by side walls 24 and by means of which, in the assembled state of the clamp 2, a passage 20 for holding a pipe 5 is formed. Longitudinal ribs 28 that extend in the longitudinal direction, for making contact with a held pipe 5, are arranged in the recess 23 of each clamp part 21, 22, at a distance from one another. The longitudinal ribs are produced from an elastomer and have a trapezoid cross-section, in such a manner that an obtuse angle α is formed, in each instance, at the delimitation edges between the held pipe 5 and the longitudinal ribs. In the exemplary embodiment, this angle is between 95° and 105°. Alternatively, the longitudinal ribs can also be produced from the plastic of the corresponding clamp part 21, 22.

The top side 25 of the clamp parts 21, 22, facing away from the recess 23, has an outer curvature that is configured in the form of a spherical section. In the center, a cylindrical guide dome 27 is arranged on the top side 25. On both sides of the guide dome 27, two spring tongues 26 are positioned diametrically opposite one another, extending orthogonally outward, which tongues have an engagement projection 261 on their end sides, which projections extend outward, in each instance, in the direction facing away from the guide dome 27. The distance between the two spring tongues 26 essentially corresponds to the length of the perforations 13 of the bracing rail 1. The clamp parts 21, 22 can be engaged into a perforation 13 of a bracing rail 1, in each instance, by way of the spring tongues 26 having an engagement projection 261, wherein the engagement projections 261 engage behind the edge of the perforation 13, in each instance. The clamp part 21, 22 then lies against the cover side 11 of the bracing rail 1, which side has an inner curvature, with the outer curvature of its top side 25.

In the exemplary embodiment, the spacer block 3 is configured as a plastic injection-molded part, and comprises a first block piece 31 and a second block piece 32, which are configured identically in the present case. The block pieces 31, 32 are configured to be oblong, corresponding to the clamp parts 21, 22, and have a block-shaped passage 33 in the center. On the coupling surface 34 that faces the other block pieces 31, 32, in each instance, engagement tongues 35 are arranged laterally on both longitudinal sides of the block piece 31, 32, offset from one another, which tongues extend orthogonal to the coupling surface 34, in the direction of the other block piece 31, 32, in each instance. Next to each of the two engagement tongues 35, a block-shaped recess 36 is present, opposite the other engagement tongue 35, in each instance, in which recess a step 361 is arranged. The two block pieces 31, 32 can be connected to one another, in an interlocking manner, by laying their coupling surfaces 34 against one another, wherein their engagement tongues 35 slide along a recess 36 of the other block piece 31, 32, in each instance, until they engage behind the step 361 that is present there, in an interlocking manner. The engagement tongues 35 are then held by the recesses 36, which they fill, to a great extent.

Delimiting the passage 33, the block pieces 31, 32 have two spring tongues 38 arranged opposite one another, in each instance, on their top side 37 that lies opposite the coupling surface 34, which tongues, corresponding to the spring tongues 26 of the clamp parts 21, 22, have engagement projections 381 on their end side, which projections extend outward, in each instance, in the direction facing away from the spring tongue 38 that lies opposite, in each instance. The distance between the two spring tongues 38 once again essentially corresponds to the length of the perforations 13 of the bracing rail 1. By way of the spring tongues 38, the block pieces 31, 32 can be engaged into a perforation 13 of a bracing rail 1, in each instance, wherein the engagement projections 381 engage behind the edge of the perforation 13, in each instance.

The tensioning anchor 4 is essentially formed from a threaded rod 41 that has a head piece 42 on its end side, which piece is formed in the manner of a hammer head in the exemplary embodiment. In the present case, the threaded rod 41 has an outside thread that extends over its entire length. However, the outside thread can also extend only over an end region that lies opposite the head piece 42.

In the exemplary embodiment according to FIG. 1, two clamps 2 are arranged, the first clamp parts 21 of which are fastened in place, in an interlocking manner, by way of their spring tongues 26, on two adjacent perforations 13 of a first bracing rail 1, on their side facing away from the side strips, and the second clamp parts 21 of which are fastened in place, in an interlocking manner, by way of their spring tongues 26, on two adjacent perforations 13 of a second bracing rail 1, once again on their side facing away from the side strips. A first block piece 31, in each instance, is fastened in place, in an interlocking manner, on the two outer perforations 13 of the first bracing rail 1, and a second block piece 31 is fastened in place, in an interlocking manner, on the two outer perforations 13 of the second bracing rail 1, by way of their spring tongues 38. After a pipe 5 has been laid into the first clamp parts 21 of the first bracing rail 1, in each instance, the second clamp parts 22 fastened onto the second bracing rail 1 are positioned onto the first clamp parts 21, wherein the first block pieces 31 are set onto the second block pieces 32, engaging into one another by means of the engagement tongues 35. The threaded rod 41 of a tensioning anchor 4 is passed through the passages 33 of the block pieces 31, 32 of each spacer block 3, which passages align with one another, until the head piece lies against a bracing rail 1, and are tightened on the end side by means of a hex flange nut 43. By way of the two tensioning anchors 4, the clamp parts 21, 22 of each clamp 2 are tensioned against the pipe 5 held in them, in each instance, by way of the bracing rails 1 that are tensioned against one another, with their longitudinal ribs 28. Alternatively, the tensioning anchors 4 can also be anchored in a structure that is present below the bracing rail 1, for example a cable channel.

As is particularly evident from FIG. 2 b), one of the fastened pipes 5 has an angle deviation in its course. By means of the adjustable fastening of the two clamp parts 21, 22, these are pivoted accordingly, and thereby precisely concentric holding of this pipe 5 in the clamp 2 is guaranteed, as well.

In the exemplary embodiment according to FIG. 4, four clamps 2 are arranged between the two bracing rails 1, whereby a clamp part 21, 22 is fastened in place at each perforation 13 of the bracing rails 1, and on the end side, in each instance, a block piece 32 is fastened in place, in an interlocking manner. A pipe 5 is clamped in each of the clamps 2, between their longitudinal ribs 28, wherein an obtuse angle α is present at the delimitation edges of the longitudinal ribs 28 relative to the pipe 5, in each instance (see FIG. 5b)). In FIG. 5a), the degree of movement of the adjustably fastened clamp to balance out angle deviations of a pipe 5 to be clamped in place is shown.

The apparatus according to the invention is characterized, in particular, by simple assembly as well as the possibility of easy situation-related placement of clamps on site, wherein due to the adjustable fastening in place of the clamp parts 21, 22 on the bracing rails 1, equalization of angle deviations of pipes 5 to be fastened in place is possible.

The invention claimed is:

1. A device for fastening pipes in place comprising at least one clamp that comprises a first clamp part and a second clamp part, wherein the clamp parts each have a recess, wherein the recesses, when assembled, form a passage for holding a pipe, wherein at least three longitudinal ribs are arranged in the passage, at a distance from one another, for making contact with a held pipe, the ribs extending in the longitudinal direction of the held pipe, wherein two bracing rails are arranged, wherein the first clamp part of the at least one clamp is adjustably fixed in place on the first bracing rail, and the second clamp part of the at least one clamp is adjustably fixed in place on the second bracing rail, wherein the two bracing rails are connected opposite one another by bracing means, by which the two bracing rails are braced relative to one another, and thereby the first and second clamp parts of the at least one clamp that are arranged opposite one another are braced against the held pipe held by the at least one clamp, wherein the two bracing rails are each provided with perforations, wherein the first and second clamp parts, in each instance, have at least one fastening element that engages behind one of the perforations, penetrating through the perforation, and wherein the clamp parts have two fastening elements that are configured in the form of spring tongues that lie opposite one another and have engagement projections, wherein the engagement projections each extend in the direction facing away from the opposite spring tongue, and engage behind the corresponding perforation.

2. The device according to claim 1, wherein at least two of the perforations are configured to be rectangular and are arranged uniformly at a distance from and parallel to one another, in the corresponding bracing rail.

3. The device according to claim 1, wherein the clamp parts have a guide dome between the two fastening parts, wherein the guide dome projects through the corresponding perforation.

4. The device according to claim 1, wherein the clamping rails have an inner curvature that is curved about their longitudinal axis, wherein the clamp parts of the at least one clamp have an outer curvature, with which the clamp parts lie against the inner curvature of a bracing rail.

5. The device according to claim 1, wherein the first and second clamp parts are configured to be identical.

6. The device according to claim 1, wherein at least all of the perforations are configured to be rectangular and are arranged uniformly at a distance from and parallel to one another, in the corresponding bracing rail.

7. The device according to claim 3, wherein the guide dome is cylindrical.

8. The device according to claim 4, wherein the inner curvature has an arc-shaped cross-section, and the outer curvature is in the form of a spherical section.

9. A device for fastening pipes in place comprising at least one clamp that comprises a first clamp part and a second clamp part, wherein the clamp parts each have a recess, wherein the recesses, when assembled, form a passage for holding a pipe, wherein at least three longitudinal ribs are arranged in the passage, at a distance from one another, for making contact with a held pipe, the ribs extending in the longitudinal direction of the held pipe, wherein two bracing rails are arranged, wherein the first clamp part of the at least one clamp is adjustably fixed in place on the first bracing rail, and the second clamp part of the at least one clamp is adjustably fixed in place on the second bracing rail, wherein the two bracing rails are connected opposite one another by bracing means, by which the two bracing rails are braced relative to one another, and thereby the first and second clamp parts of the at least one clamp that are arranged opposite one another are braced against the held pipe held by the at least one clamp, wherein the clamping means comprise at least two tensioning anchors, each of which is guided through a perforation of the two bracing rails, as well as through a spacer block arranged between the bracing rails, wherein the spacer block comprises a first block piece and a second block piece, wherein the first block piece is fastened to the first bracing rail and the second block piece is fastened to the second bracing rail, wherein the block pieces each have at least one fastening element that engages behind one of the perforations of the bracing rail, in each instance, passing through this perforation, and wherein the block pieces have two fastening elements that are configured in the form of spring tongues arranged opposite one another and provided with engagement projections, wherein the engagement projections extend, in each instance, in the direction facing away from the opposite spring tongue, and engage behind the perforation, in each instance.

10. The device according to claim 9, wherein each of the at least two tensioning anchors comprises a threaded rod onto which a nut is screwed for tensioning the bracing rails relative to one another.

11. The device according to claim 9, wherein the block pieces of each spacer block have an outer curvature with which the block pieces lie against the inner curvature of a bracing rail.

12. The device according to claim 9, wherein at least one of the two block pieces of a spacer block has at least one engagement element, by which the at least one of the two block pieces is connected, with shape fit, with the other block piece.

13. The device according to claim 12, wherein the block pieces of a spacer block are configured identically.

14. The device according to claim 10, wherein the nut is a hex flange nut.

15. The device according to claim 9, wherein both of the two block pieces of a spacer block have at least one engagement element, by which the block pieces are connected, with shape fit, with each other.

* * * * *